United States Patent
Jain et al.

(10) Patent No.: US 7,477,641 B2
(45) Date of Patent: Jan. 13, 2009

(54) PROVIDING ACCESS TO DATA SHARED BY PACKET PROCESSING THREADS

(75) Inventors: Sanjeev Jain, Shrewsbury, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 11/026,652

(22) Filed: Dec. 30, 2004

(65) Prior Publication Data

US 2006/0159103 A1 Jul. 20, 2006

(51) Int. Cl.
*H04L 12/28* (2006.01)
(52) U.S. Cl. .......................... 370/389; 709/214; 726/24
(58) Field of Classification Search ........................ None
See application file for complete search history.

(56) References Cited

U.S. PATENT DOCUMENTS

| | | | |
|---|---|---|---|
| 6,625,654 B1 * | 9/2003 | Wolrich et al. .............. | 709/230 |
| 6,694,397 B2 | 2/2004 | Lackey, Jr. et al. | |
| 7,228,569 B2 * | 6/2007 | Barrenscheen .............. | 726/34 |
| 2002/0007443 A1 | 1/2002 | Gharachorloo et al. | |
| 2004/0088487 A1 | 5/2004 | Barroso et al. | |
| 2004/0098496 A1 | 5/2004 | Wolrich et al. | |
| 2005/0025055 A1 | 2/2005 | Jain et al. | |
| 2005/0036495 A1 | 2/2005 | Wishneusky et al. | |
| 2005/0038964 A1 | 2/2005 | Hooper et al. | |
| 2005/0039182 A1 | 2/2005 | Hooper et al. | |
| 2005/0220114 A1 | 10/2005 | Romano et al. | |
| 2005/0220115 A1 | 10/2005 | Romano et al. | |

OTHER PUBLICATIONS

Liu, et al: On the Effectiveness of Sectored Caches in Reducing False Sharing Misses; Dep't of Computer Science; Hsinchu, Taiwan, R.O.C., 1997 IEEE, pp. 352-359.
PCT/US2005/047379 Int'l Search Report & Written Opinion dated Apr. 4, 2006.
"Written Opinion of the International Searching Authority", PCT/US2005/047379, (Jul. 12, 2007), 11 pgs.
Adiletta, et al., The Next Generation of Intel IXP Network Processors, Intel Technology Journal vol. 6, Issue 3, Aug. 15, 2002, pp. 6-18.
Johnson, et al., IXP2400/2800 Programming The Complete Microengine Coding Guide, May 20, 2003, cover page, 9-70, 183-262 and 293-307.
Carlson, Intel Internet Exchange Architecture and Applications A Practical Guide to IXP2XXX Network Processors, May 2003, cover page, 1-49, 121-151 and 183-231.

* cited by examiner

*Primary Examiner*—Robert W Wilson
(74) *Attorney, Agent, or Firm*—Robert A. Greenberg

(57) ABSTRACT

In general, in one aspect, the disclosure describes a method that includes at a first packet processing thread executing at a first core, performing a memory read to data shared between packet processing threads including the first thread. The method also includes at the first packet processing thread, determining whether the data returned by the memory read has been changed by a packet processing thread operating on another core before performing an exclusive operation on the shared data by the first packet processing thread.

5 Claims, 5 Drawing Sheets

PROVIDING ACCESS TO DATA SHARED BY PACKET PROCESSING THREADS

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network forwarding devices (e.g., "routers", "bridges" and/or "switches") before reaching its destination. These intermediate devices often perform a variety of packet processing operations. For example, intermediate devices often perform packet classification to determine how to forward a packet further toward its destination or to determine the quality of service to provide.

These intermediate devices are carefully designed to keep apace the increasing volume of traffic traveling across networks. Some architectures implement packet processing using "hardwired" logic such as Application Specific Integrated Circuits (ASICs). While ASICs can operate at high speeds, changing ASIC operation, for example, to adapt to a change in a network protocol can prove difficult.

Other architectures use programmable devices known as network processors. Network processors enable software programmers to quickly reprogram network processor operations. Some network processors feature multiple processing cores to amass packet processing computational power. These cores may operate on packets in parallel. For instance, while one core determines how to forward one packet further toward its destination, a different core determines how to forward another. This enables the network processors to achieve speeds rivaling ASICs while remaining programmable.

DETAILED DESCRIPTION

Network devices perform a variety of operations to process packets. These operations can include packet classification, determining how to forward a packet, and so forth. To perform these operations on the large volume of rapidly arriving packets, some devices feature multi-core processors where the different cores simultaneously operate on packets in parallel. In some processors, the cores can execute multiple threads. The threads can further mask the latency of certain operations such as memory accesses. For example, after one thread issues a memory read, a different thread can execute while the first thread awaits the data being retrieved.

Figure 1A:
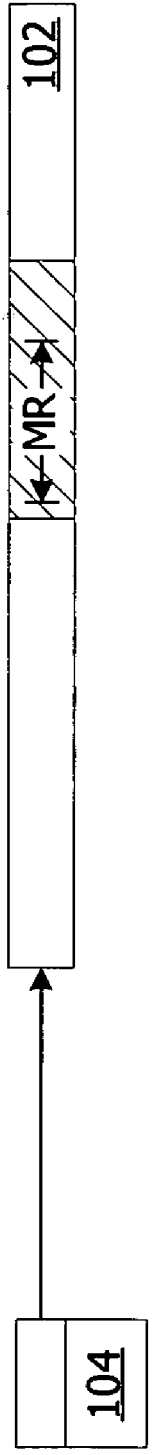
FIGS. 1A-1C illustrates a thread processing a packet.

A wide variety of software architectures can be used to process packets. For example, FIG. 1A depicts a sample packet processing architecture where a packet 104 is processed by a thread 102. The thread 102 can feature a series of packet processing stages such as a de-encapsulation stage, packet classification stage, metering stage, queueing stage, and so forth. By performing operations on a packet using the same thread, data associated with the packet can remain in quickly accessible local memory.

Though different threads may operate on different packets, the threads may nevertheless need to share access to the same data. For example, the different packets may belong to the same packet flow (e.g., an Asynchronous Transfer Mode (ATM) circuit or Transmission Control Protocol/Internet Protocol (TCP/IP) connection). Thus, the different threads may vie for access to update the flow-related data (e.g., the number of flow packets received). To coordinate access to this shared data, the threads may feature one or more critical sections of instructions (shaded) executed by each thread. A critical section protects shared data by preventing more than one thread from executing the shared data access operations of the critical section at a time. For example, the critical section may use a lock (e.g., a mutual exclusion (mutex)) that a thread acquires before it can continue critical section execution. After acquiring the lock, the thread can read, modify, and write the shared data back to memory. The thread can then release the lock to permit access by other threads.

While ensuring coherency in the shared data, threads implementing a critical section, as described above, may experience a delay awaiting completion of the initial memory read of the shared data performed by the thread 102 upon entering the critical section. For example, as shown in FIG. 1A, after entering a critical section, the thread 102 issues a read to access the data shared by the different threads. Due to the latency associated with memory operations, the thread 102 may wait a considerable period of time for the access to complete. In a "lock-step" implementation where each thread must complete each critical section within a fixed period of time, the memory access may leave the thread 102 with little time to perform operations on the shared data after the read completes.

Figure 1B:
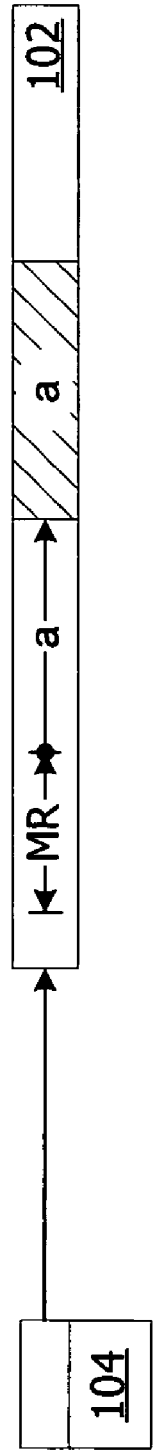

As shown in FIG. 1B, to avoid the latency associated with the initial critical section read of the shared data, thread 102 can issue a memory read operation to initiate a memory read (labeled MR) of the shared data from memory before thread 102 execution reaches the critical section. In the example shown, the retrieved value of the shared data has an arbitrarily labeled value of "a". As shown, by using the retrieved copy, the thread 102 can avoid the initial memory access latency after entering the critical section, essentially moving the latency to a more convenient time.

Figure 1C:
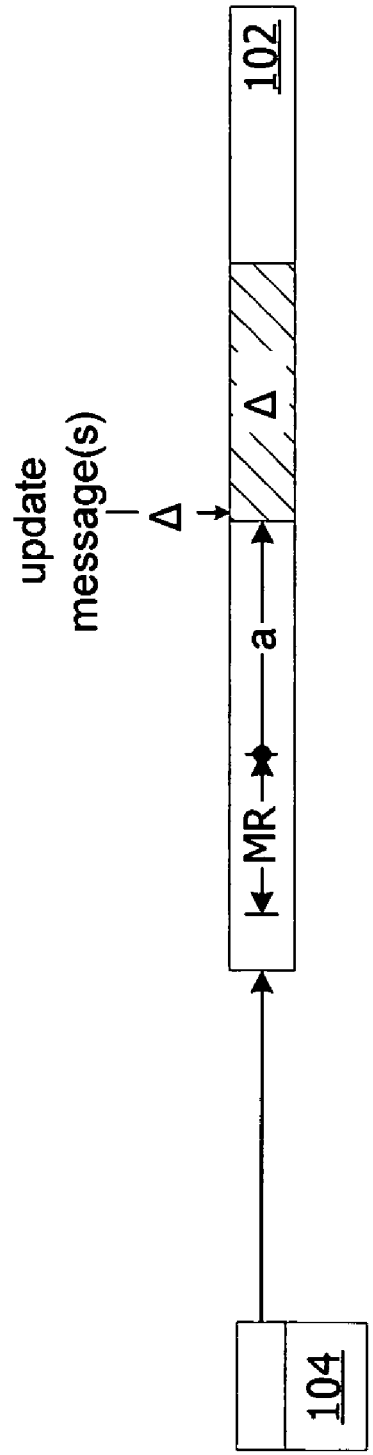

Use of the copy of shared data in FIG. 1B, however, assumes that the shared data was not changed in the period of time between the read of thread 102 and the entry of thread 102 into the critical section. As shown in FIG. 1C, to preserve coherence in the shared data in this scenario, a core executing thread 102 may receive one or messages from another core indicating that one or more threads on the other core made changes to the shared data. The updated values (arbitrarily labeled "Δ") may completely replace the "early" copy made by the thread 102 or only update a few data elements. As shown, by using the updated values instead of the copy ("a"), thread 102 can preserve data coherence while still avoiding a costly read operation inside the critical section. That is, the thread 102 either uses data obtained by the pre-critical section read and/or data included in the update messages. In either case, a memory read to retrieve the shared data is not needed upon entering the critical section To recap, in the absence of update message(s) (FIG. 1B), the thread 102 can safely assume that the value ("a") copied from memory before reaching the critical section can be used. However, when update messages indicate changes to the shared data (FIG. 1C), the thread 102 uses the updated data ("Δ") instead of the data copied from memory earlier.

Figure 2A:
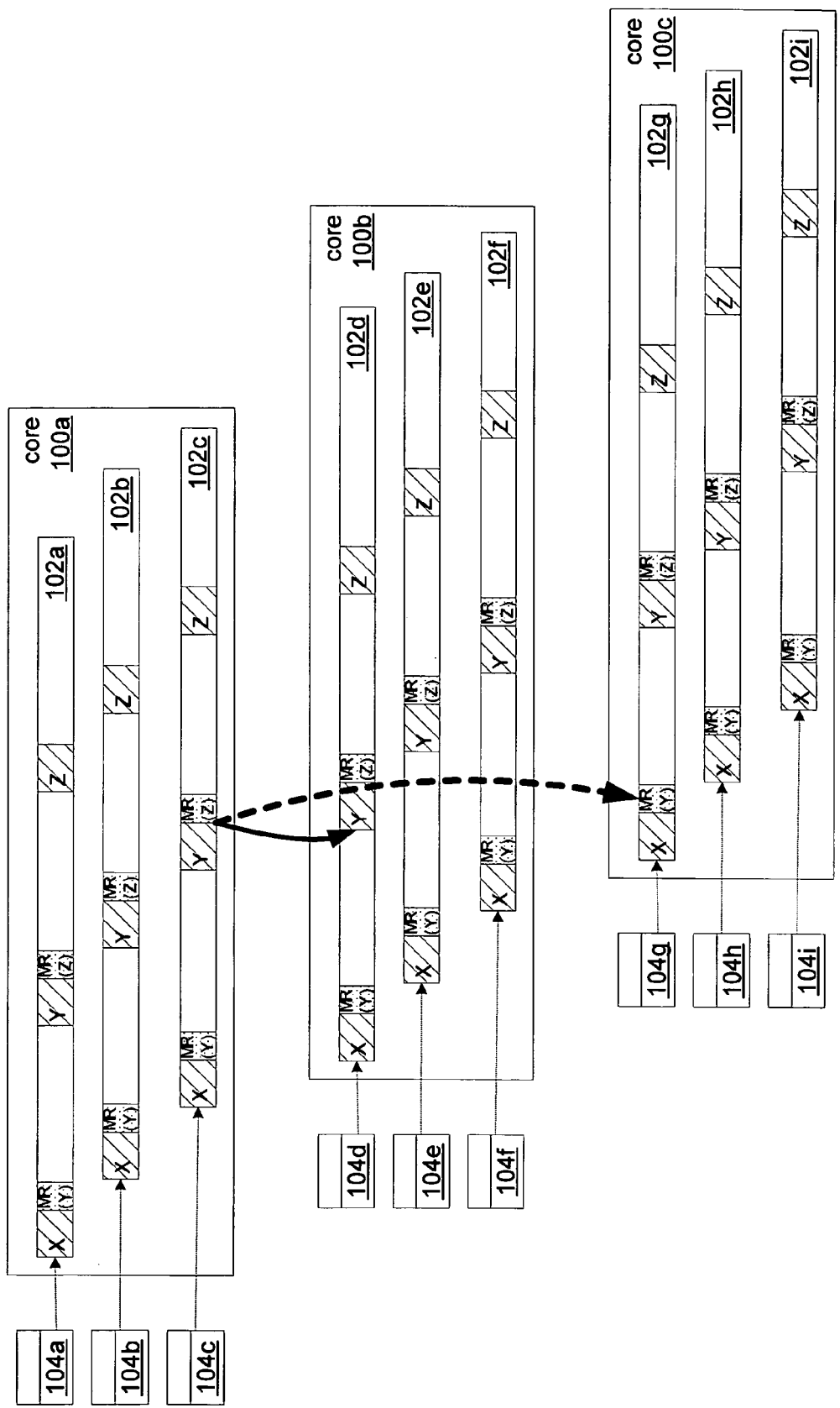
FIGS. 2A-2B illustrates a sample packet processing architecture.
Figure 2B:
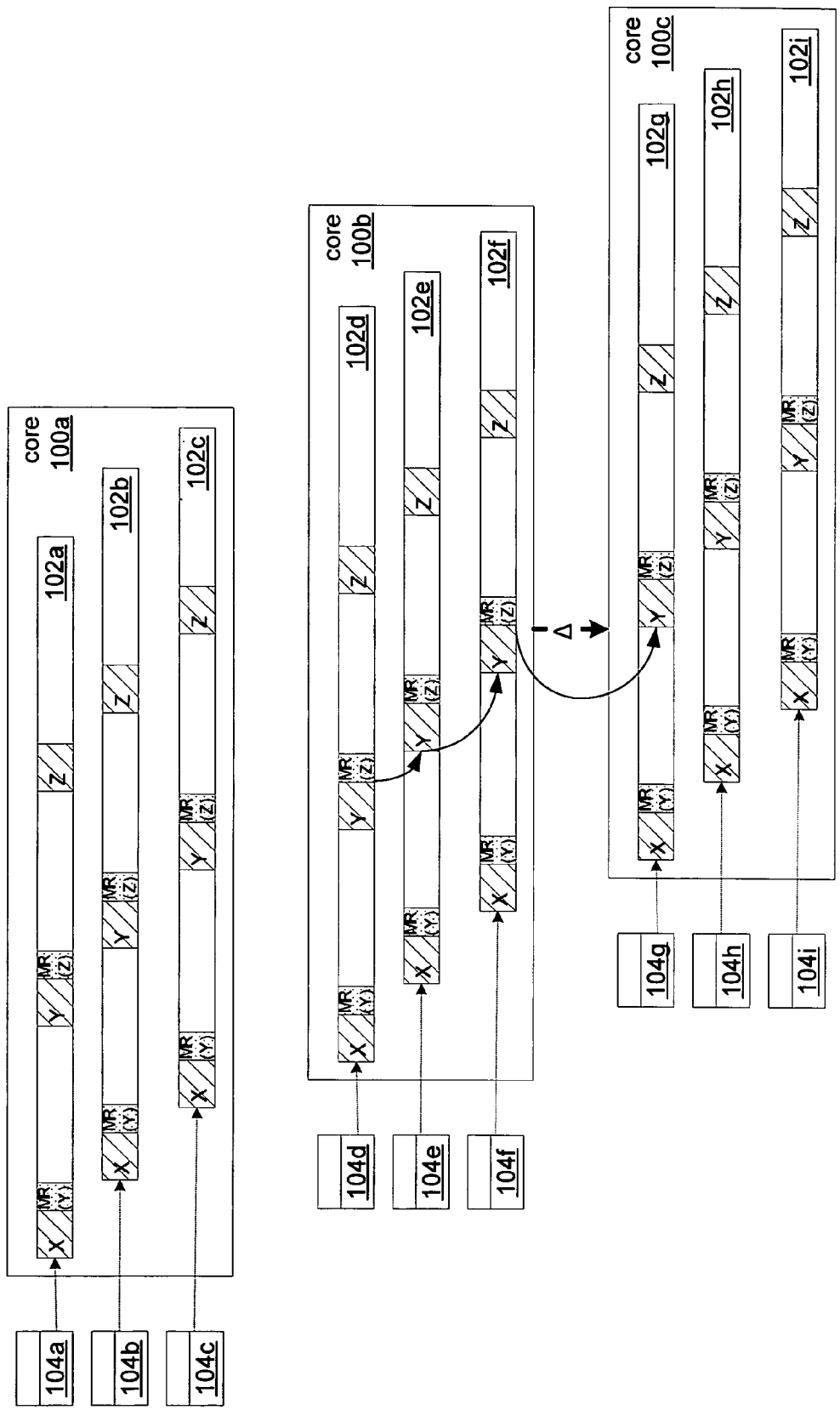

FIGS. 2A-2B illustrate the use of this technique in a software architecture designed for a multi-threaded multi-core environment. As shown in FIG. 2A, in this architecture, each packet 104a-104i is processed by a respective thread 102a-102i. In the example shown, each thread 102a-102i features multiple critical stages (arbitrarily labeled X, Y, and Z). Entry into each critical stage by different threads 102a-102 is controlled by a signaling scheme. That is, each thread awaits a signal from a previous thread completing a given critical section before entering that critical section. For example, thread 102d awaits a signal from thread 102c before executing critical section Y. Thread 102c provides this signal (the solid arrow between threads 102c and 102d in FIG. 2A) to thread 102d when thread 102c completes critical section Y. Likewise, thread 102e awaits a signal from thread 102d before entering a given critical section, thread 102f awaits a signal from thread 102e, etc. This chain of signals sent by each thread permitting entry into a given critical section creates a sequence of threads 102a-102i entering the critical section. As shown, the sequence of threads spans multiple cores with each core providing some set of the threads. The sequence may "wrap-around" (not shown). That is, thread 102i may signal thread 102a to enter a given critical section for a next packet.

As shown in FIG. 2A, in addition to signaling the next thread in the sequence to enter a completed critical section, a thread can issue a signal that permits a pre-critical section read. For example, as shown, thread 102c not only issues a signal to thread 102d permitting entry of thread 102d into critical section Y, the thread 102c also issues a signal (shown as a dotted line between threads 102c and 102g) to core 100c that permits threads 102d-102f on core 100c to initiate a pre-critical section read (labeled MR(Y)) of shared data protected by critical section Y. As shown, the signal triggering the pre-critical section read skipped the set of threads 102d-102f provided by an intermediate core 100b in the thread sequence.

As shown, the pre-critical section read may be provided by one or more instructions executed at the end of a previous critical section (e.g., MR(Y) occurs at the end of critical section X). Thus, as thread 102d enters critical section Y, thread 102g can initiate a pre-critical section read (MR(Y)) that will complete before thread 102g enters critical section Y.

As shown in FIG. 2B, eventually, after sequential execution of critical section Y by threads 102d, 102e, and 102f, thread 102g on core 100c receives a signal from thread 102f permitting entry into critical section Y. Again, due to the signal earlier received from thread 102c, thread 102g has already copied shared data for critical section Y into local core 100c memory before thread 102g enters critical section Y. Potentially, however, any of the intervening threads 102d-102f that executed critical section Y after/during the pre-critical section read of thread 102g may have altered the shared data. Thus, as shown, the thread(s) 102d-102f can write messages indicating changes (labeled "Δ") to the shared data to the core 100c executing the thread 102g that performed the pre-critical section read. The messages indicating an update of data can include a flow identifier and a sequence of variable values and, potentially, field identifiers indicating which data values have been changed. The flow identifier may be formed from a tuple of header data (e.g., the IP source and destination addresses and transport layer source and destination ports). If such messages were sent, the thread 102g can use the updated data instead of data obtained in the pre-critical section read. In either case, the latency associated with a memory operation to read the shared data within the critical section can be avoided.

FIGS. 2A-2B simplified some aspects of the implementation for ease of illustration. For example, FIG. 2A illustrated a single signal permitting entry into a critical section and a single signal permitting the pre-critical section read. In operation, thread 102c may issue both types of signal at the completion of each critical section (e.g., X, Y, Z) so configured. Additionally, threads 102f and 102i (and other lcore threads) may similarly provide such signals to threads/cores downstream in the thread sequence. Further, these signals may also "wrap around". For example, thread 102f may signal thread 102a to perform a pre-critical section read for critical section "X" for a next packet after thread 102f completes critical section X.

While FIGS. 2A-2B illustrated a core that provided three threads, a core may provide many more threads (e.g., 8 or 16) or less. Similarly, a processor will typically include more than three cores (e.g., 8 or 16). Additionally, while FIGS. 2A-2B illustrated a given packet being processed by a single thread, a packet may be processed by more than one thread. For example, a first core may perform a first set of operations for a packet and pass the packet off to a second core for the next set of operations.

Figure 3:
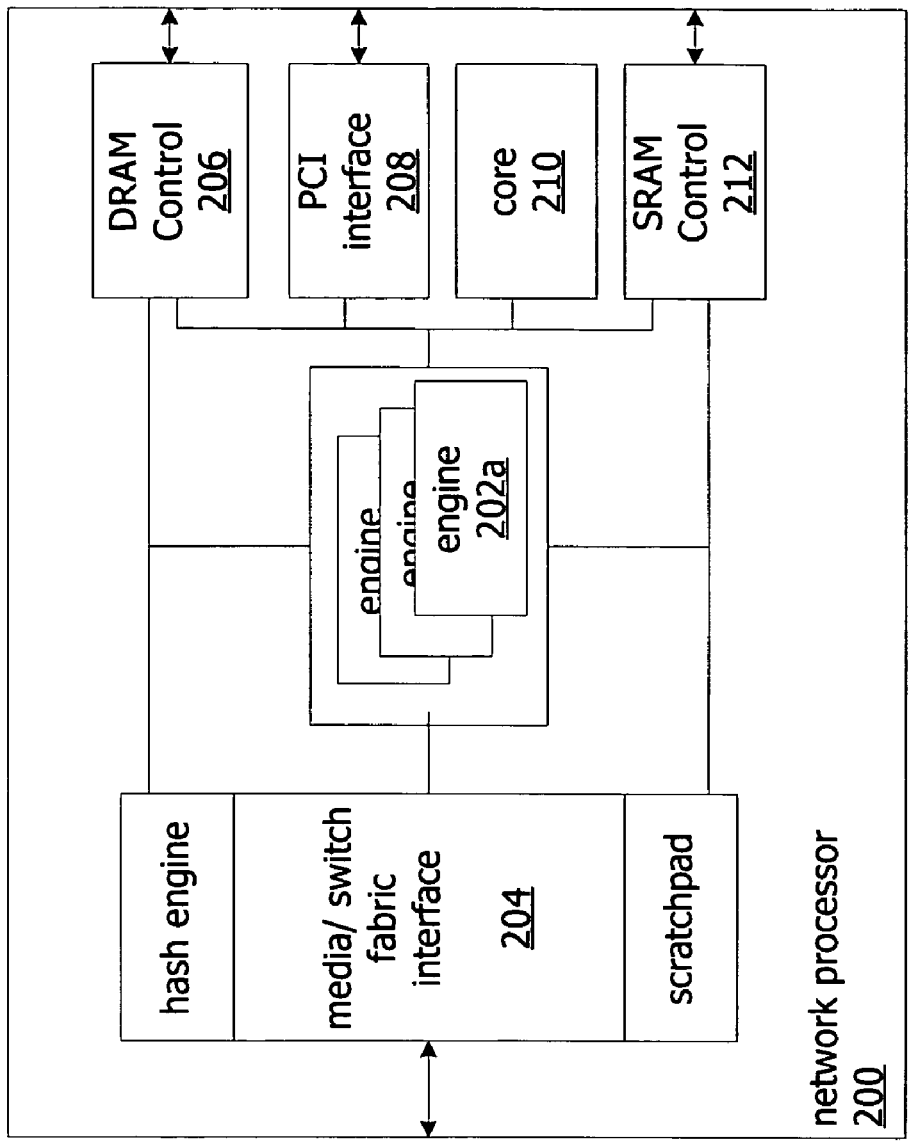
FIG. 3 is a diagram of a multi-core processor.

The techniques can be implemented in a wide variety of hardware environments. For instance, FIG. 3 depicts an example of network processor 200. The network processor 200 shown is an Intel® Internet eXchange network Processor (IXP). Other network processors feature different designs.

The network processor 200 shown features a collection of processing cores 202 on a single integrated semiconductor die. Each core 202 may be a Reduced Instruction Set Computing (RISC) processor tailored for packet processing. For example, the cores 202 may not provide floating point or integer division instructions commonly provided by the instruction sets of general purpose processors. Individual cores 202 may provide multiple threads of execution. For example, a core 202 may store multiple program counters and other context data for different threads.

As shown, the network processor 200 also features at least one interface 202 that can carry packets between the processor 200 and other network components. For example, the processor 200 can feature a switch fabric interface 202 (e.g., a Common Switch Interface (CSIX)) that enables the processor 200 to transmit a packet to other processor(s) or circuitry connected to the fabric. The processor 200 can also feature an interface 202 (e.g., a System Packet Interface (SPI) interface) that enables the processor 200 to communicate with physical layer (PHY) and/or link layer devices (e.g., MAC or framer devices). The processor 200 also includes an interface 208 (e.g., a Peripheral Component Interconnect (PCI) bus interface) for communicating, for example, with a host or other network processors.

As shown, the processor 200 also includes other components shared by the cores 202 such as a hash core, internal scratchpad memory shared by the cores, and memory controllers 206, 212 that provide access to external memory shared by the cores. The network processor 200 also includes an additional processor 210 (e.g., a StrongARM® XScale®) that is often programmed to perform "control plane" tasks involved in network operations. The core processor 210, however, may also handle "data plane" tasks.

The cores 202 may communicate with other cores 202 via core 210 or other shared resources. The cores 202 may also intercommunicate via neighbor registers featuring a direct wired connection to adjacent core(s) 202. The next neighbor registers can be used as a First-In-First-Out (FIFO) queue between adjacent cores. Alternately, cores 202 may communicate with non-adjacent cores, e.g., via a Control and Status Register Proxy reflect operation that moves data between transfer registers of the cores.

Individual cores 202 may feature a variety of local memory elements in additional to a given amount of local core 202 RAM. For example, each core 202 may include transfer registers that buffer data being read from/written to targets external to the cores 202 (e.g., memory or another core). Additionally, each core may feature a command FIFO queue that queues commands being sent to other elements. In addition to the transfer registers, the individual cores 202 may also feature other local core memory such as a content addressable memory (CAM).

The features of the network processor may be used to implement the techniques described above. For example, the CAM of a core may be used to determine whether shared data has been updated. For example, the CAM may store an ID of shared data (e.g., a packet flow and, potentially, field identifier) and a pointer to the location where shared data is currently stored (e.g., in one or more transfer registers or local core RAM). When a core receives a shared data update message, a thread executing on the core can compare the flow ID of the messages against the flow IDs currently stored in the CAM. A match indicates that the update messages correspond to a shared data obtained by a pre-critical section read and the thread can correspondingly write the updated values into local RAM and set a corresponding "dirty" bit in a predefined memory location indicating that the value to be used is in local core memory instead of the transfer registers. Upon entering a critical section, a thread can check the associated "dirty" bit to determine which data to use. In the event of a CAM "miss", the core can disregard the update message as the updated data is not needed.

Potentially, the CAM may be logically divided into segments to identify shared data of different critical sections. For example, a first set of CAM entries may be used to store shared data IDs for the critical section being executed while the next set of CAM entries is used to store shared data IDs for the following critical section. For example, a critical section identifier may be prepended to the flow id key stored in the CAM or a fixed number of entries (e.g., entries 1-8) may be assigned to the section. In such an implementation, before a first thread of a core starts a critical section (e.g., critical section X), the thread also clears the CAM segment related to the next critical section (e.g., Y) so that pre-critical section reads launched for Y can be stored in the CAM segment.

To illustrate application of the techniques described above, FIGS. 2A-2B will be renarrated using the features of the network processor architecture shown in FIG. 3. In this sample implementation, when the last thread 102c of core 100a exits critical section Y, the thread 102c, if necessary, sends the shared data IDs and updates to shared data affected by core 100a execution of critical section Y through the next neighbor registers to core 100b along with a next neighbor signal that enables core 100b threads to enter critical section Y. The core 100a also sends a signal towards thread 102g in core 100c by placing a command in the core 100a command FIFO after a command writing the shared data to external memory. Due to the sequential handing of commands in the command FIFO, when the signal reaches core 100c, it is guaranteed that the write back of data modified by core 100a execution of critical section Y has moved towards its destination. On receiving this signal, threads in core 100c are permitted to initiate memory reads (e.g., to SRAM or DRAM) for the critical section Y and store the shared data in the core's 100c transfer registers. The results of a pre-critical section read can be tracked by a CAM entry storing the corresponding shared data ID and location of the copy of the shared data in the transfer registers.

The core 100c threads continue execution until reaching critical section Y When a core 100c thread reaches critical section Y, the thread checks for a signal coming from core 100b signaling that updated data messages have been queued in the core's 100c next neighbor registers. If the signal is available, the thread uses the shared data ID from the next neighbor registers to do a CAM search. If the ID matches a CAM entry, the pre-critical section data read into the core transfer registers from memory is obsolete and needs to be updated with the data included in the update messages currently in the core's 100c next neighbor registers. At this point, a dirty bit for the CAM entry may be set and the update data stored in local core memory. After all the update messages (e.g., (shared data ID, var) pairs) enqueued to the core 100c in the next neighbor registers have been processed, threads on core 100c can enter critical section Y in turn. The threads can access the dirty bit to determine whether to access the shared data from the transfer registers or the local core memory.

As described above, the sequence of critical sections may "wrap around". E.g., execution of critical section X by thread 102a follows execution of critical section X by thread 102i. To provide such wrap-around signaling, the CAP may be used to write signals and update messages to a core that is not directly connected by next neighbor circuitry.

Figure 4:
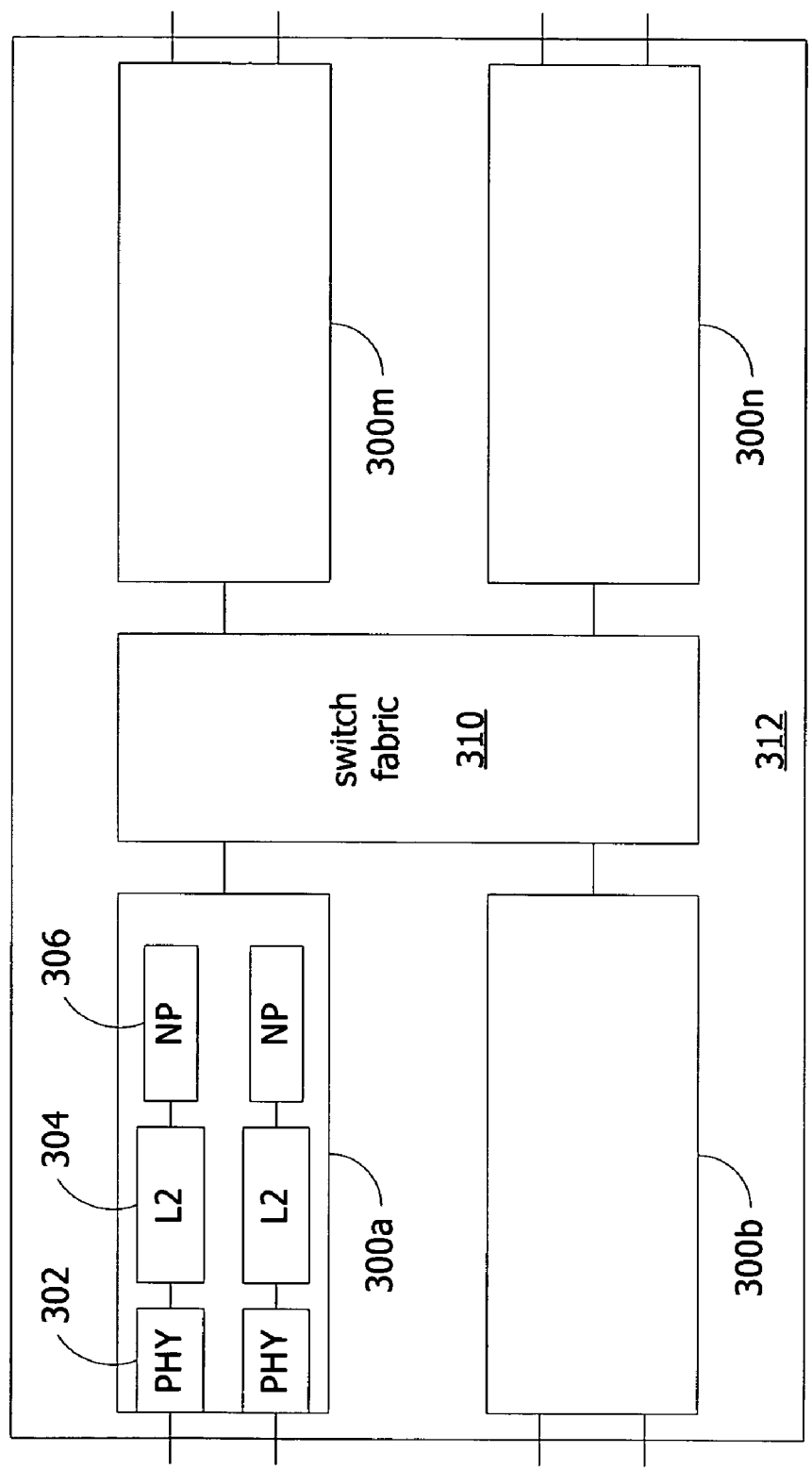
FIG. 4 is a diagram of a network forwarding device.

FIG. 4 depicts a network device that can process packets using techniques described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual line cards (e.g., 300a) may include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown may also include one or more network processors 306 that perform packet processing operations for packets received via the PHY(s) 302 and direct the packets, via the switch fabric 310, to a line card providing an egress interface to forward the packet. Potentially, the network processor(s) 306 may perform "layer 2" duties instead of the framer devices 304.

While FIGS. 3 and 4 described specific examples of a network processor and a device incorporating network processors, the techniques may be implemented in a variety of architectures including network processors, general purpose processors (e.g., a Central Processing Unit (CPU)), and network devices having designs other than those shown. Additionally, the techniques may be used in a wide variety of network devices (e.g., a router, switch, bridge, hub, traffic generator, and so forth). The term packet can apply to IP (Internet Protocol) datagrams, TCP (Transmission Control Protocol) segments, ATM (Asynchronous Transfer Mode) cells, Ethernet frames, among other protocol data units.

The term circuitry as used herein includes hardwired circuitry, digital circuitry, analog circuitry, programmable circuitry, and so forth. The programmable circuitry may operate on computer programs such as instructions included on an article of manufacture such as a Read Only Memory or other storage medium.

Other embodiments are within the scope of the following claims.

What is claimed is:

1. A system comprising:
   multiple multi-thread programmable cores integrated on a single die;
   logic to:
   process packets using a sequence of packet processing threads provided by the multiple multi-threaded programmable cores, the sequence of threads spanning a sequence of cores including, at least, a first core, a second core, and a third core, individual threads including at least one critical section that coordinates access to data shared by the threads;
   wherein a thread in the sequence of packet processing threads executing on the first core performs operations comprising:
   issuing a first signal to the third core permitting a pre-critical section read of shared data protected by a first critical section;
   wherein a thread in the sequence of packet processing threads executing on the second core performs operations comprising:
   executing the first critical section; and
   if the data shared is modified within the first critical section, sending one or more messages to the third core identifying changes; and
   wherein a thread in the sequence of packet processing threads executing on the third core performs operations comprising:
   receiving the first signal from the first core;
   after receiving the first signal from the first core, performing a memory access to retrieve a copy of data shared by the packet processing threads before entering the critical section that coordinates access to the shared data;
   determining whether the data shared by the packet processing threads has changed from the copy based on whether the third core received the at least one or more messages identifying the changes to the data shared;
   if the data has not changed, using the retrieved data in the critical section;
   if the data has changed, using the changed data in the critical section.

2. The system of claim 1,
   wherein the one or more messages are transmitted from the second core to the third core via a direct connection between the second core and the third core.

3. The system of claim 1,
   wherein the determining whether the data shared by the packet has changed comprises performing a lookup based on an identifier associated with a packet.

4. The system of claim 3, wherein the lookup comprises Content Addressable Memory (CAM) search.

5. The system of claim 4, wherein the CAM is logically segmented into sets of entries associated with different critical sections executed by the threads.

* * * * *